United States Patent [19]

Proffit et al.

[11] Patent Number: 5,055,689

[45] Date of Patent: Oct. 8, 1991

[54] HORIZON SENSOR APPARATUS AND METHOD THEREFOR

[75] Inventors: Robert L. Proffit, Foster City; Edward A. Rose, San Jose, both of Calif.

[73] Assignee: Quantic Industries, Inc., San Carlos, Calif.

[21] Appl. No.: 471,218

[22] Filed: Jan. 26, 1990

[51] Int. Cl.$^5$ .............................................. G01J 5/08
[52] U.S. Cl. ...................................... 250/349; 250/342
[58] Field of Search ......................... 250/349, 347, 342

[56] References Cited

U.S. PATENT DOCUMENTS

| | | | |
|---|---|---|---|
| 3,090,583 | 5/1963 | Behun et al. | 250/342 |
| 3,237,010 | 2/1966 | Elliott et al. | 250/347 |
| 3,418,478 | 12/1968 | Falbel | 250/342 |
| 3,486,024 | 12/1969 | Astheimer | 250/338.1 |
| 3,519,823 | 7/1970 | Heller et al. | 250/347 |
| 4,785,169 | 2/1988 | Gontin | 250/342 |

OTHER PUBLICATIONS

Page from Quantic's prior horizon sensor.

Primary Examiner—Carolyn E. Fields
Assistant Examiner—Drew A. Dunn
Attorney, Agent, or Firm—Flehr, Hohbach, Test, Albritton & Herbert

[57] ABSTRACT

A horizon sensor for spacecraft utilizes two or three telescopes, each imaging upon a linear array of pyroelectric elements. The telescopes are pointed at the earth's horizon and the transition or midpoint angle between earth and space is determined in processing the output signals from each pyroelectric array. Low cost and versatility are provided with great accuracy due to, for example, use of a 32 element pyroelectric array. Such pyroelectric material is also tolerant of temperature changes and inertial forces.

5 Claims, 5 Drawing Sheets

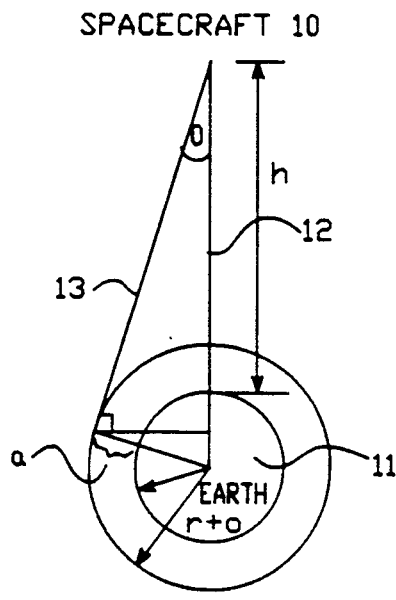
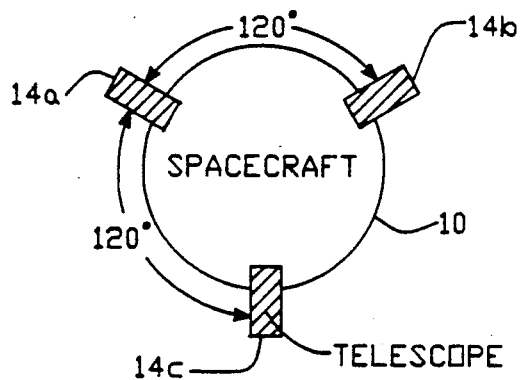
FIG.−1    FIG.−2
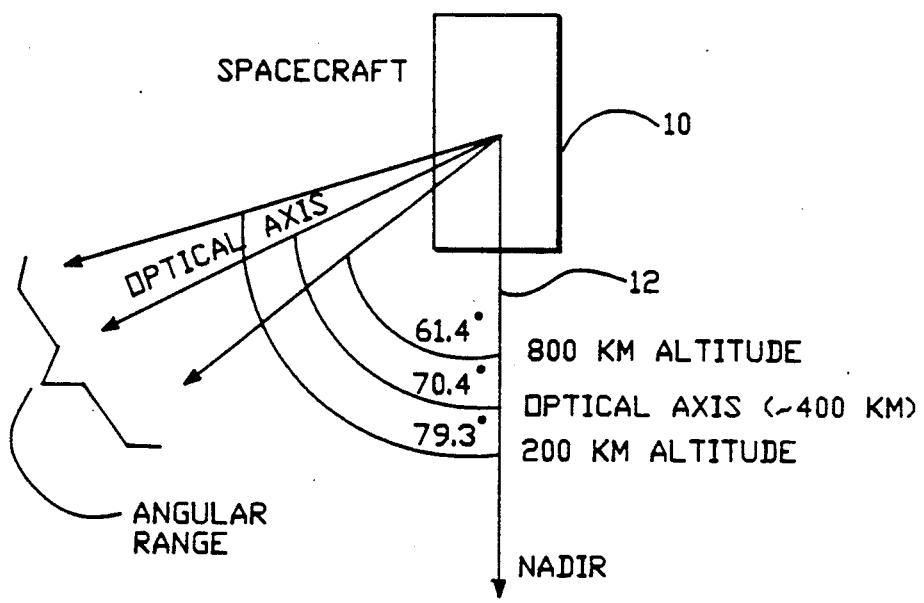
FIG.−3

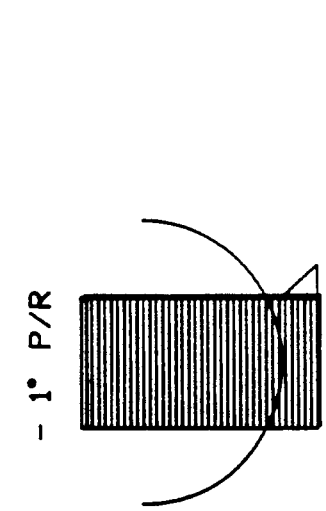
FIG.—8A
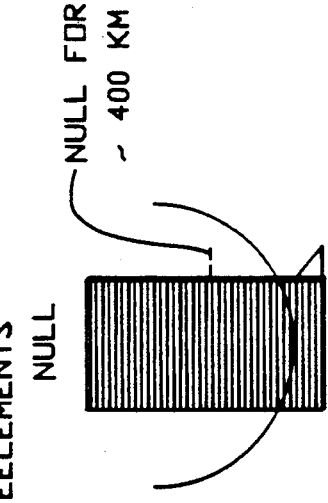
FIG.—8B
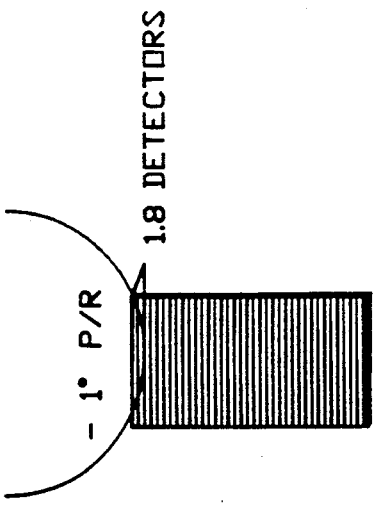
FIG.—8C
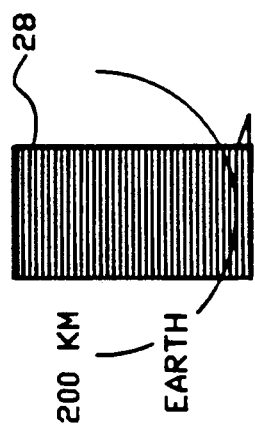
FIG.—9A
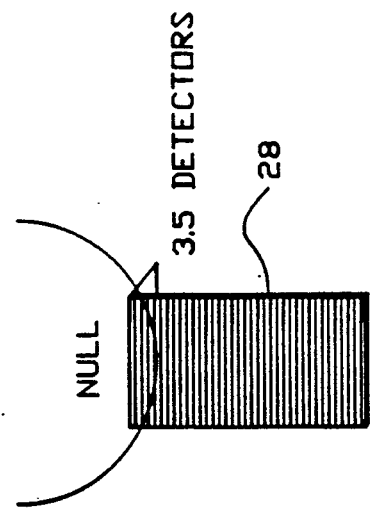
FIG.—9B
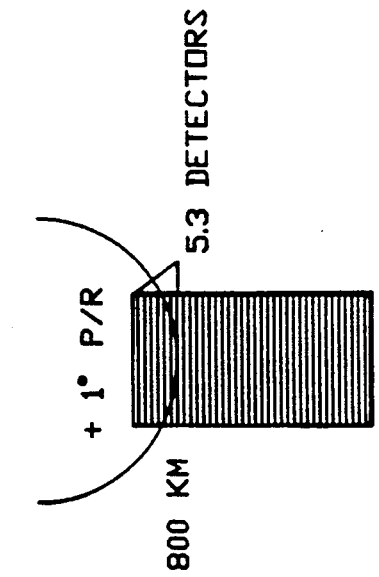
FIG.—9C

HORIZON SENSOR APPARATUS AND METHOD THEREFOR

The present invention is directed to a horizon sensor apparatus and method therefor and more specifically to an apparatus which utilizes a linear array of elements for each telescope mounted on the spacecraft.

BACKGROUND OF THE INVENTION

Horizon sensors for sensing the infra-red radiation from the earth's atmosphere and determining an arbitrary "edge" of such atmosphere are well known. One type utilizes a circular array of infra-red detectors nominally arranged around the earth's image and deviation of the earth's horizon from the center of the circular array is related to a change in pitch or roll from the null angle (zero pitch and zero roll). Pitch and roll of course relate to what is known as the attitude of the spacecraft; roll is displacement about the longitudinal axis of the spacecraft and pitch about its lateral axis (perpendicular to the longitudinal axis).

While such technique is accurate and reliable, the versatility and cost may be limited. It is desired to provide at low cost a horizon sensor which will be versatile for any spacecraft mission profile; be it low earth orbit (LEO), geosynchronous earth orbit (GEO), or transition earth orbit (TEO).

OBJECT AND SUMMARY OF THE INVENTION

It is therefore a general object of the present invention to provide an improved horizon sensor apparatus and method therefor.

In accordance with the above object, there is provided a horizon sensor apparatus for a space craft for determining at least the attitude (namely, pitch and roll) of the spacecraft relative to the edge of the earth's horizon, where at least two telescopes are mounted on the spacecraft (one relating to pitch and the other to roll) with their optical axes normally pointed at such edge for a given altitude of the spacecraft above earth. The apparatus comprises at least two linear arrays of a plurality of elements responsive to infra-red radiation from the earth's atmosphere as projected on said arrays through said telescopes. Each element of an array is responsive to the relative presence or lack of infra-red radiation to indicate a unique attitude. One of said elements is indicative of a null condition where the optical axis of a respective telescope is pointed directly at the horizon edge, and adjacent elements on opposite sides in the linear array of the one element are indicative of a positive or negative pitch/roll displacement.

BRIEF DESCRIPTION OF DRAWINGS

FIG. 1 is a diagrammatic view showing a spacecraft above the earth and showing the parameters involved in the context of horizon sensing.

FIG. 2 shows a diagrammatic spacecraft with telescopes aimed at the earth's horizon mounted thereon.

FIG. 3 is a diagram of the spacecraft and its telescope system showing the angular range of the present invention in a low earth orbit application.

FIGS. 8A, 8B and 8C illustrate the image of the earth on a detector array for one given altitude.

FIGS. 9A, 9B and 9C show the image of the earth on the same detector array for another given altitude.

DESCRIPTION OF PREFERRED EMBODIMENT

Referring now to FIG. 1 this illustrates the general orientation of a spacecraft 10 above the earth 11. A line from the spacecraft to the center of the earth 12 is termed the nadir. The altitude of the spacecraft above earth is indicated as "h"; the radius of the earth is "r" and the edge of the earth's horizon (which is the average mid-point of the carbon dioxide of the earth's atmosphere) is indicated as "a." Thus the angle (designated "phi"), from the nadir line 12 going to the center of the earth to the tangent line 13 to the earth's atmosphere, can be considered as a null angle when the optical axis of a telescope positioned in the spacecraft is pointed directly at the edge of the earth's atmosphere (the "a" distance).

Normally on a spacecraft, as illustrated in FIG. 2, three telescopes 14a, 14b, 14c would be used. These are mounted 120° around the spacecraft and have an optical axis aimed at the earth's horizon which is determined beforehand and depends on the geometry of the attitude and the altitude at which the spacecraft is to be used. Thus, referring also to FIG. 3, for an approximate altitude of 400 Kms, an appropriate angle might be 70.4°. Referring back to FIG. 1, if the spacecraft 10 is located at this altitude, the optical axis of the telescope should coincide with the tangent line 13 to be aimed directly at the edge of the earth's horizon.

This null angle of zero pitch and roll may be defined as an arc sine, as shown by the equations shown on the equations page infra.

Referring again to FIG. 3 and in accordance with the invention, other altitudes can be accommodated by the use of a linear array of sensing elements, such as from 200 Kms to 800 Kms. These are indicated in FIG. 3 along with the null angle for that particular altitude, viz., 79.3° and 61.4°. Thus, it is obvious from inspection of FIG. 3 that the null angle may vary from the optical axis of the telescopes.

And in general, with the use of two telescopes, as illustrated in FIG. 2, the attitude of the spacecraft may be determined; namely, pitch and roll. And with the third telescope, the altitude may also be determined. However, from a practical standpoint, since altitude is predetermined from the launching of the spacecraft, this may not be necessary.

Figure 4:
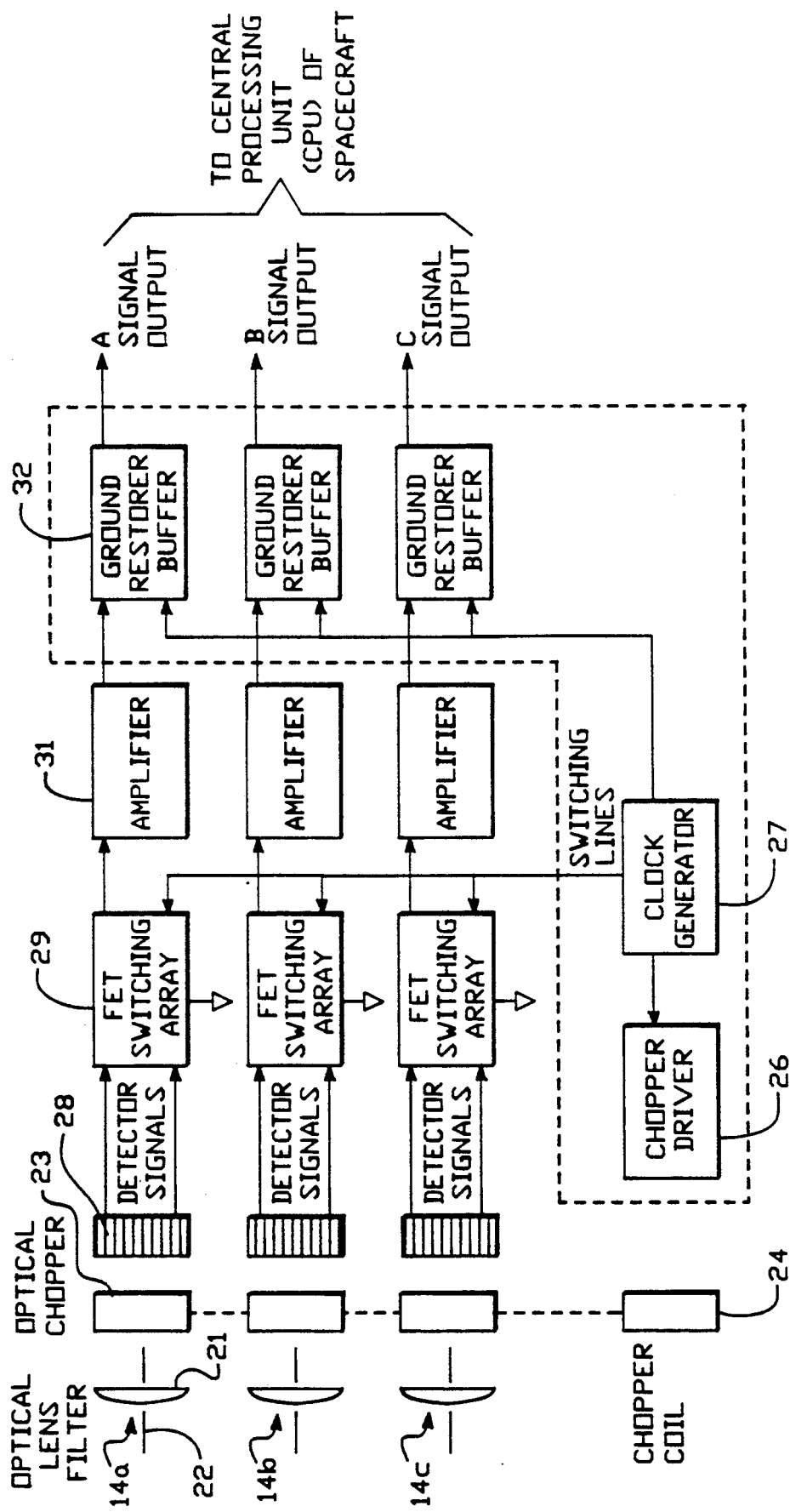
FIG. 4 is a block diagram of &:he apparatus electronics mounted in the spacecraft for processing array signals from the telescopes.

FIG. 4 illustrates the processing of the earth images received to telescope 14a, 14b, 14c. With reference to telescope 14a, its image is passed through an optical lens filter 21 which is centered on the optical axis 22 of the telescope. Then for each scope there is an optical chopper 23 driven by a chopper coil 24, chopper driver 26 and a clock generator 27. Such chopper is necessary since the pyroelectric array, which ultimately senses the optical signal, responds only to a change in signal. Associated with each telescope is a linear pyroelectric array 28 which consists typically of 32 elements.

Figure 5:
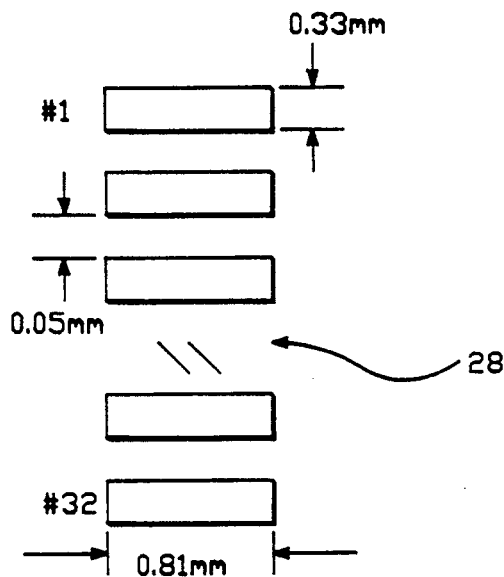
FIG. 5 is a plan view of a typical infra-red radiation sensitive array used in the present invention.

Referring briefly to FIG. 5, such an array is illustrated in detail where the dimensions are given with each element of the 32 being composed of a pyroelectric crystal such as lithium tantalate. Such material is durable and tolerable to heat and acceleration, and is especially sensitive to infrared radiation in the wavelengths especially useful for sensing the earth's horizon; specifically, at 15 micrometers for sensing carbon dioxide and in the range of 22-32 micrometers for sensing water. And such detector array is available commercially from Eltec Instruments of Daytona Beach, Fla., as Model AR170-25.

Referring back to FIG. 4, a field effect transistor switching array unit 29 scans the signal output from each of the detectors of the array 28 (being driven by the clock generator 27) and, via amplifier 31 and ground restore buffers 32, produces a signal output. Each telescope has its associated linear array of pyroelectric detectors and thus there are three signal outputs designated A, B and C. These are sent to the central processing unit (CPU) of the spacecraft for further processing, as will be indicated below.

Figure 6:
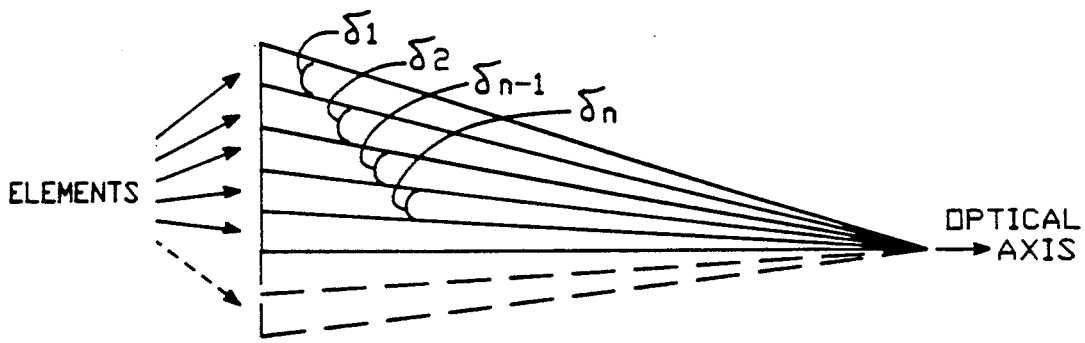
FIG. 6 is a diagram illustrating the "delta" angle deviation of each element of an array from the optical axis of the telescope with which it is associated.
Figure 10:
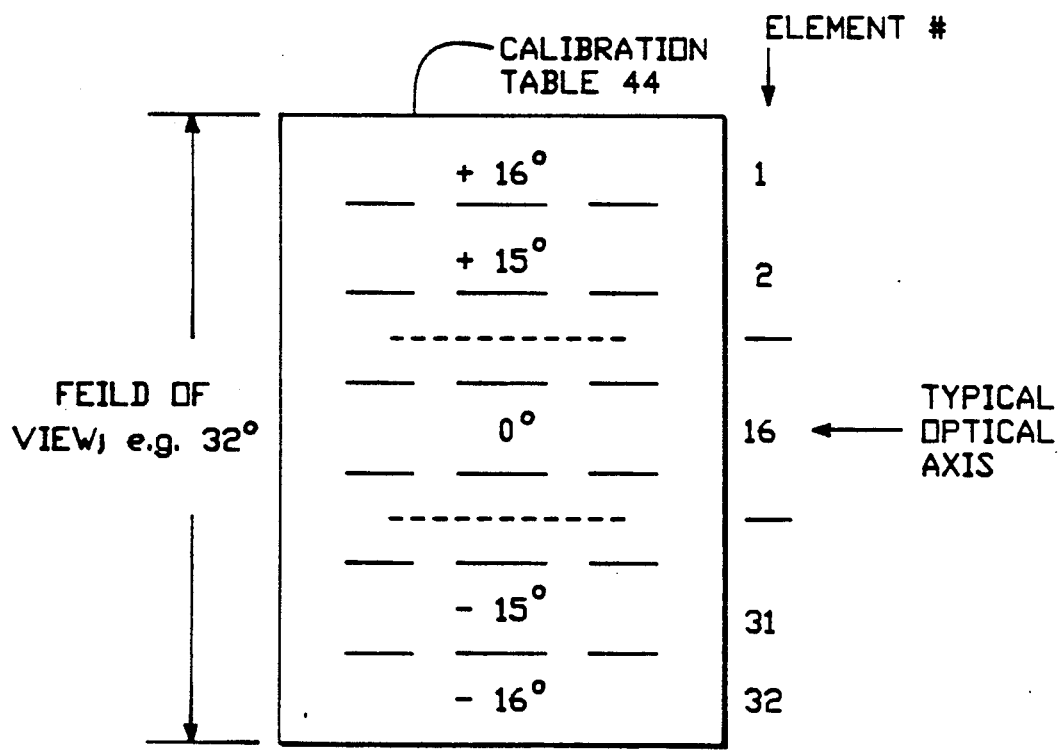
FIG. 10 is a calibration table useful in the operation of the present invention.

Thus, as illustrated in FIG. 6, with relation to the optical axis of a particular telescope, each element of an array 28 associated with that telescope provides a unique attitude angle (pitch or roll) with respect to the optical axis of that scope. And such angle designated "delta" may be either in a positive direction from the telescope optical axis or a negative direction. More specifically, as a factory calibration (as illustrated in FIG. 10), a calibration table is constructed where typical degrees are given. Thus, the calibration table would assume an optical access of a telescope which has a null condition (0 pitch, 0 roll) on the element number 16. This is designated 0°. Then depending on the geometry of the entire telescope linear array structure, the field of view may be 32°, for example. Thus, the delta angles in one direction would proceed from 1° to 16° in a positive direction and in the other direction 1° to 16°. It should be emphasized, however, that the angle of the nadir to the telescope optical axis designated angle "phi" is mainly determined by geometry considerations of vehicle altitude and attitude range. Thus, the calibration values of table in FIG. 10 are merely typical.

Figure 7:
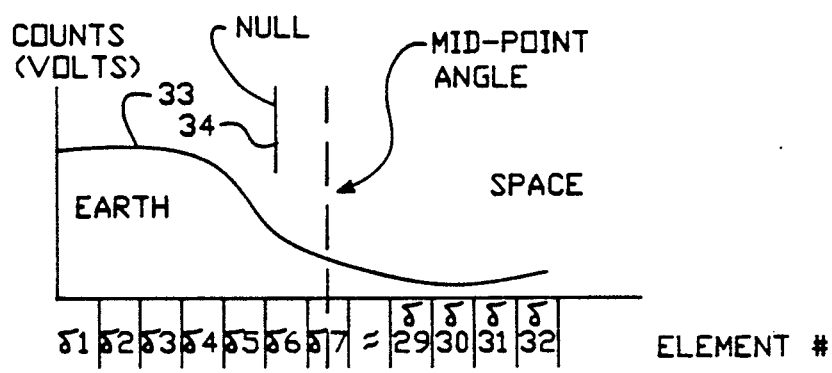
FIG. 7 is a curve useful in understanding how a midpoint angle is derived.

FIG. 7 more clearly illustrates the function of the linear array in sensing the earth's horizon or its edge. This is termed the midpoint angle. Thus, as shown by the curve 33, there is a gradual decrease in sensor output going from earth to space. This is due to the upper earth atmosphere falling off in radiant intensity from full earth to space. This data from the linear array of sensor elements is processed in the spacecraft by an on-board computer (CPU) to determine the midpoint of the curve outlined by the array data. Such midpoint is the horizon edge in effect. Thus, FIG. 7 shows this as occurring, for example, at element number 7. However, the elements are also marked with the "delta" angle which is (referring to the lookup table of FIG. 10) the angle from the null designated 34. Such null might occur on the optical axis when the spacecraft is at the designated design altitude or, if in a different transitional orbit, the null element would be different. In any case, the calibration table shows a constant number of degrees, for instance, between each element so the difference between elements 6 and 7 would be computed to find the difference in degrees between the null and midpoint.

The foregoing is more clearly illustrated in FIGS. 8 and 9. Here the image of the earth is placed on the detector linear arrays 28. FIGS. 8A, 8B and 8C show a 200 km altitude and may be referenced to FIG. 3. With regard to FIG. 3, the optical axis of the telescope from the nadir was placed at 70.4°. Thus, as shown in FIG. 8B, the relative null element would be, as also indicated in FIG. 10, typically element 16 for approximately a 400 Km altitude. However, with a change to a 200 Km altitude, the null element has now moved to that illustrated in FIG. 8B which is approximately 3.5 detector elements from the lower edge. This change of the null position may be easily computed by the central processing unit of the spacecraft from equation 1. In other words, at the 200 km altitude the null angle is actually 79.3° as determined by equation 1. This difference of approximately 9° from the 70° optical axis may then be converted to a number of detector elements which, with the geometry of the example of FIGS. 3 and 8, is indicated for each degree of pitch or roll as 1.77 detector elements. Thus, such constants, when multiplied together as illustrated in FIG. 8B, explain the difference between the null element (approximately element number 16) for 400 km and that for 200 km. Then for a positive 1° change in pitch or roll (as shown in FIG. 8A), the horizon edge moves an average of 1.77 detector elements and for the opposite negative direction, as shown in FIG. 8C, the same number of detector elements.

In contrast, FIG. 9 illustrates the great angular range provided by the present invention where FIG. 9B shows that the null position is now at the upper edge of the array 28. And the ±1° pitch or roll changes are illustrated respectively in FIGS. 9A and 9C.

As the spacecraft attitude changes, the position of the midpoint element changes giving a different delta angle from each telescope. Such delta angle may be utilized by the CPU to give a direct indication of the change in pitch or roll from the null position.

Referring now to the equations page, the change of the null angle $\phi$ from its null position may be calculated by differentiating equation 1 with equation 2 resulting. Here, of course, the term "$\Delta a$" is the pitch or roll distance from an absolute standpoint.

Equation 3 shows a convenient constant "C."
Next, as shown in equation 4, $$\frac{\Delta a}{R_v}$$

is the sine of the delta angle; viz., the change of $\Delta a$ with respect to the hypotenuse 12 which is of course the radius of the earth plus the altitude of the spacecraft.

Equation 5 is a re-arrangement of equation 4.

Equation 6 is equation 2 rewritten and then with equation 5 substituted for $\Delta a$. Substituting equation 7 in equation 6 yields the pitch and roll changes in equations 8 and 9. The delta angles are of course obtained by the difference between the midpoint and null elements.

Figure 11:
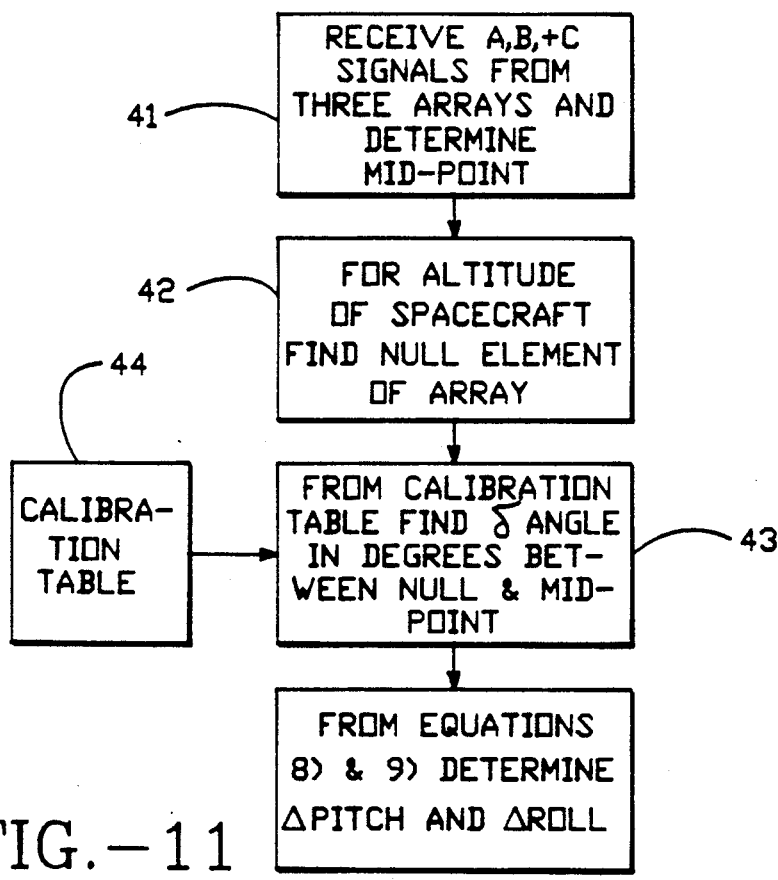
FIG. 11 is a flow chart used by the central processing unit of the spacecraft.

The foregoing process, in determining the "delta" angles, is carried out as illustrated in FIG. 11 by the CPU of the spacecraft. As shown in step 41, the A, B and C signals from the three arrays (see FIG. 4) are received and their midpoints determined as shown in FIG. 7. In step 42 for a given altitude of the spacecraft (which is either known or can be computed in a well know manner by the use of three telescopes together), the null element of the array is found. Such null element is of course illustrated in FIGS. 8B and 9B. In step 43 from the calibration table 44 already discussed in conjunction with FIG. 10, the "delta" angle in degrees between the null and the midpoint is found. And then from equations 8 and 9 as discussed above, the $\Delta$ pitch and $\Delta$ roll are found.

Thus, an improved horizon sensor is provided with the use of linear pyroelectric arrays. Accuracies of $\pm 0.1°$ are achieved. Moreover, although only a transition earth orbit has been illustrated in FIG. 2, the other orbits which are geosynchronous and low earth are easily accommodated. Thus, the present horizon sensor achieves a performance similar to that now obtained by present fairly sophisticated horizon sensors.

Equations $$\phi = \text{SIN}^{-1} \frac{r+a}{r+h} = \text{SIN}^{-1} \frac{r+a}{R_v} \quad (1)$$

null  
(zero pitch  
and roll)

where $R_v = r + h$  
$r$ = radius of earth  
$h$ = altitude (known)  
$a$ = "horizon" — 40 Km $$\Delta\phi = \frac{d\phi}{d\omega} = \frac{\Delta a}{\left[1 - \left(\frac{r+a}{R_v}\right)^2\right]^{\frac{1}{2}}} = C\Delta a \quad (2)$$

$$\text{where } C = \left[1 - \left(\frac{r+a}{R_v}\right)^2\right]^{\frac{1}{2}} \quad (3)$$

$$\text{since } \sin\delta = \frac{\Delta a}{R_v} \quad (4)$$

then $\Delta a = R_v \sin\delta$ (5)  
$\therefore \Delta\phi = C\Delta a = CR_v \sin\delta$ (6)  
$K = CR_v$ (7)  
$\Delta\phi \text{ pitch} = K \sin\delta \text{ pitch(pitch telescope)}$ (8)  
$\Delta\phi \text{ roll} = K \sin\delta \text{ roll(roll telescope)}$ (9)

What is claimed:

1. Horizon sensor apparatus for a space craft for determining at least the attitude (namely, pitch and roll) of the spacecraft relative to the edge of the earth's horizon, where at least two telescopes are mounted on the spacecraft (one relating to pitch and the other to roll) with their optical axes normally pointed at such edge for a given altitude of the spacecraft above earth, the apparatus comprising:

at least two linear arrays of a plurality of elements responsive to infra-red radiation from the earth's atmosphere as projected on said arrays through said telescopes, each element of a said array being responsive to the relative presence or lack of said infra-red radiation to indicate a unique attitude, one of said elements of an array being indicative of a null condition where said optical axis of a respective telescope is pointed directly at said edge, and adjacent elements on opposite sides in said linear array of said one element being indicative of positive or negative pitch/roll displacements.

2. Apparatus as in claim 1 where said array is of pyroelectric material especially sensitive to said infra-red radiation.

3. Apparatus as in claim 2 where said pyroelectric material is sensitive to carbon dioxide at 15 micrometers and water at 22–32 micrometers.

4. Apparatus as in claim 2 where said array is constructed of crystalline lithium tantalate.

5. A horizon sensor method for a spacecraft for determining at least the attitude (namely, pitch and roll) of the spacecraft relative to the edge of the earth's horizon, where at least two telescopes are mounted on the spacecraft (one relating to pitch and the other to roll) with their optical axes normally pointed at such edge for a given altitude of the spacecraft above earth, said method comprising the following steps:

through said telescopes projecting infra-red radiation from earth respectively on at least two linear arrays of elements responsive to said infra-red radiation;

determining the midpoint element of an array between earth and space;

finding the angle between said midpoint element and a null element where the optical axis of the telescope would be aimed directly at said horizon edge;

from said angles of the two arrays determining pitch and roll from said null.

* * * * *